(12) United States Patent
Marzano et al.

(10) Patent No.: US 11,496,075 B2
(45) Date of Patent: Nov. 8, 2022

(54) USING LINEAR SYNCHRONOUS MOTORS FOR RETARDING LINEAR MOTION AND CONVEYING SYSTEMS

(71) Applicant: Velocity Magnetics, Inc., New Castle, PA (US)

(72) Inventors: Domenic P. Marzano, New Castle, PA (US); Terry Joseph Marzano, Boardman, OH (US)

(73) Assignee: Velocity Magnetics, Inc., New Castle, PA (US)

( * ) Notice: Subject to any disclaimer, the term of this patent is extended or adjusted under 35 U.S.C. 154(b) by 271 days.

(21) Appl. No.: 16/754,776

(22) PCT Filed: Oct. 11, 2018

(86) PCT No.: PCT/US2018/055400
§ 371 (c)(1),
(2) Date: Apr. 9, 2020

(87) PCT Pub. No.: WO2019/075193
PCT Pub. Date: Apr. 18, 2019

(65) Prior Publication Data
US 2021/0203255 A1     Jul. 1, 2021

Related U.S. Application Data

(60) Provisional application No. 62/571,008, filed on Oct. 11, 2017.

(51) Int. Cl.
*H02P 3/22*      (2006.01)
*H02P 25/064*    (2016.01)
(Continued)

(52) U.S. Cl.
CPC ............... *H02P 3/22* (2013.01); *B65G 43/00* (2013.01); *B65G 54/02* (2013.01); *H02P 25/064* (2016.02); *B65G 2811/095* (2013.01)

(58) Field of Classification Search
CPC ......... H02P 3/22; H02P 25/064; B65G 43/00; B65G 54/02
(Continued)

(56) References Cited

U.S. PATENT DOCUMENTS 5,136,217 A * 8/1992 Hoffmann ............. B60L 15/005
                                                318/135
5,384,522 A   1/1995 Toriyama et al.
(Continued)

FOREIGN PATENT DOCUMENTS

CA        2045557 A1    7/1990
WO    2019051409 A1    3/2019

*Primary Examiner* — David Luo
(74) *Attorney, Agent, or Firm* — The Webb Law Firm

(57) ABSTRACT

Provided is a system for reducing velocity of a conveyance. The system may include a conveyance. A first member of a linear motor may be attached to the conveyance. A second member of the linear motor may include stator coils. The second member may be separate from the first member and may be separate from the conveyance. The first member may be moveable relative to the second member. A current-interrupting device may selectively shunt at least two coil wires of the stator coils by shorting the at least two coil wires. A method for reducing velocity of a conveyance and a method for making a system for reducing velocity of a conveyance are also disclosed.

22 Claims, 12 Drawing Sheets

(51) Int. Cl.
*B65G 43/00* (2006.01)
*B65G 54/02* (2006.01)

(58) Field of Classification Search
USPC .................................................. 318/135, 34
See application file for complete search history.

(56) References Cited

U.S. PATENT DOCUMENTS

| | | | |
|---|---|---|---|
| 5,847,533 | A | 12/1998 | Hakala et al. |
| 6,930,413 | B2 | 8/2005 | Marzano |
| 7,619,377 | B2 * | 11/2009 | Yamada ............... H02K 11/215 318/135 |
| 8,727,078 | B2 | 5/2014 | Marzano et al. |
| 10,046,644 | B2 | 8/2018 | Marzano |
| 2015/0091480 | A1 | 4/2015 | Kischka et al. |

\* cited by examiner

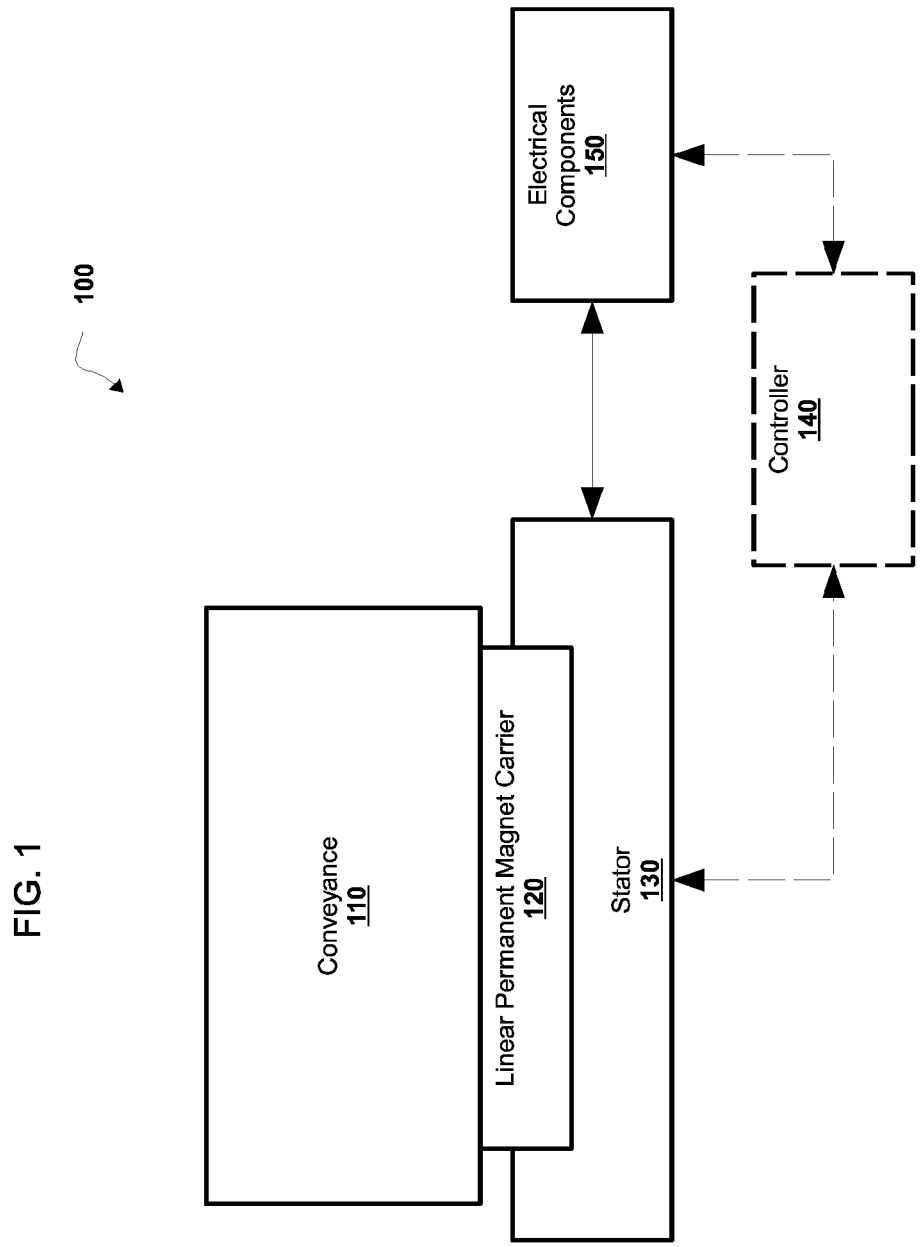

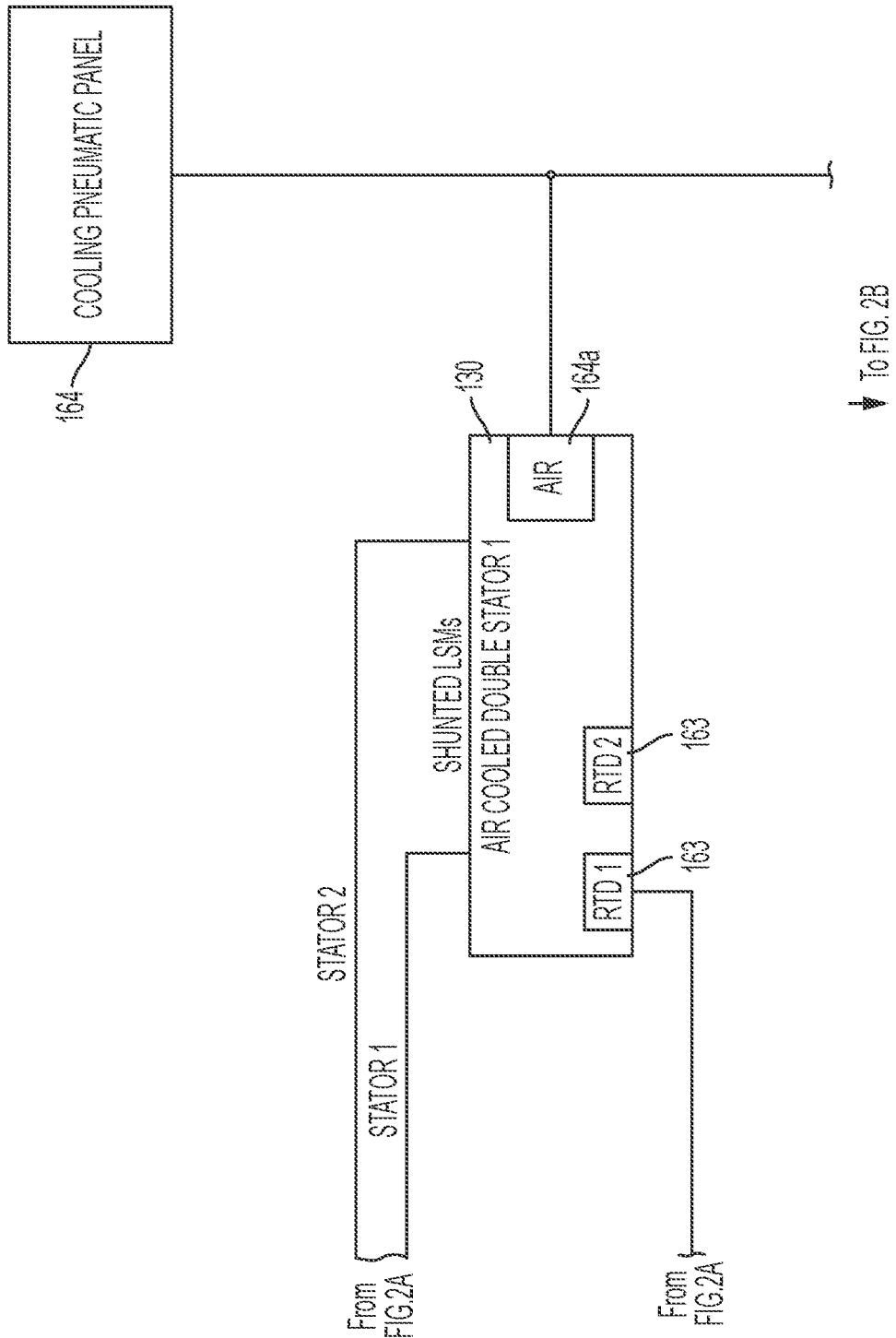

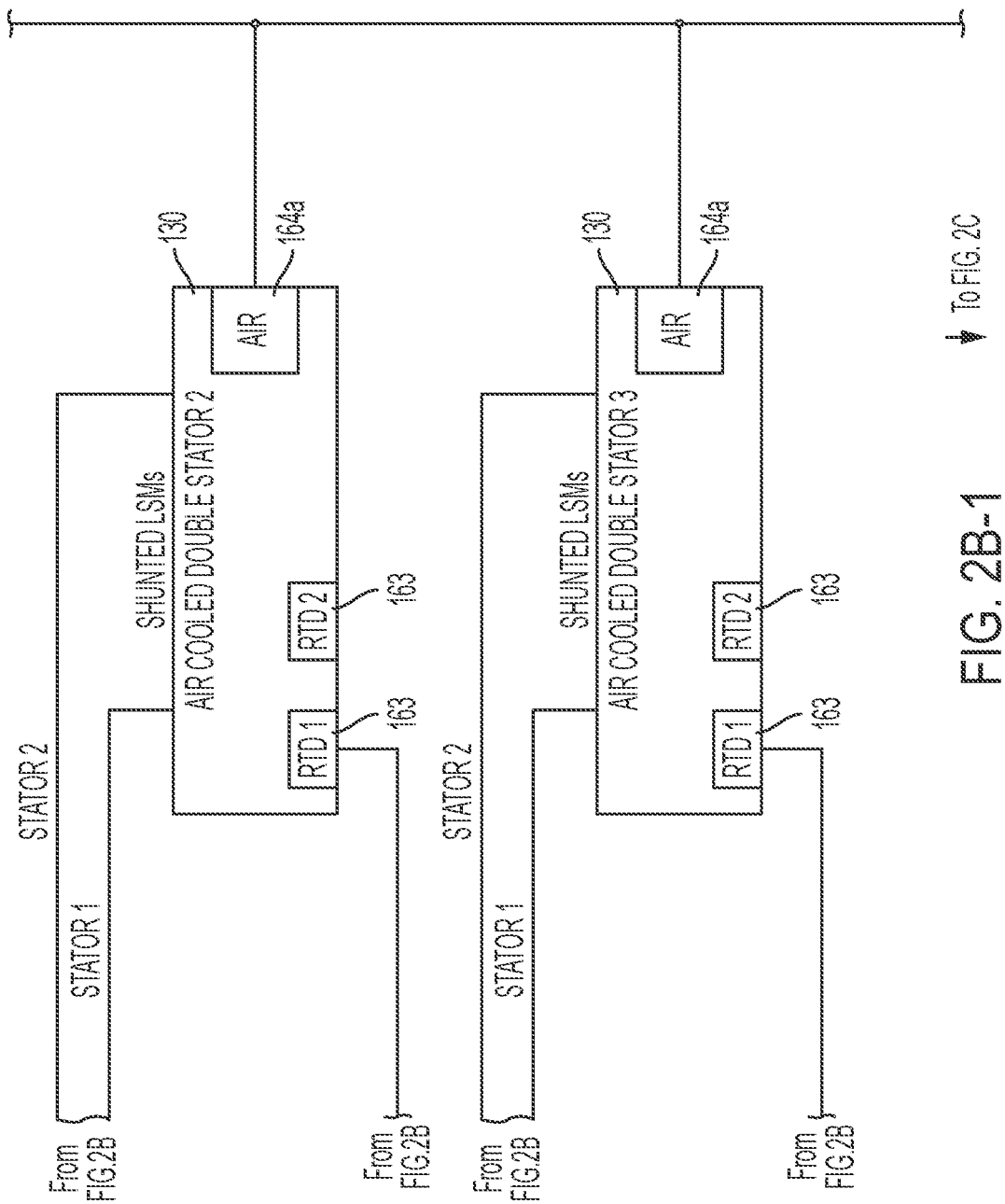

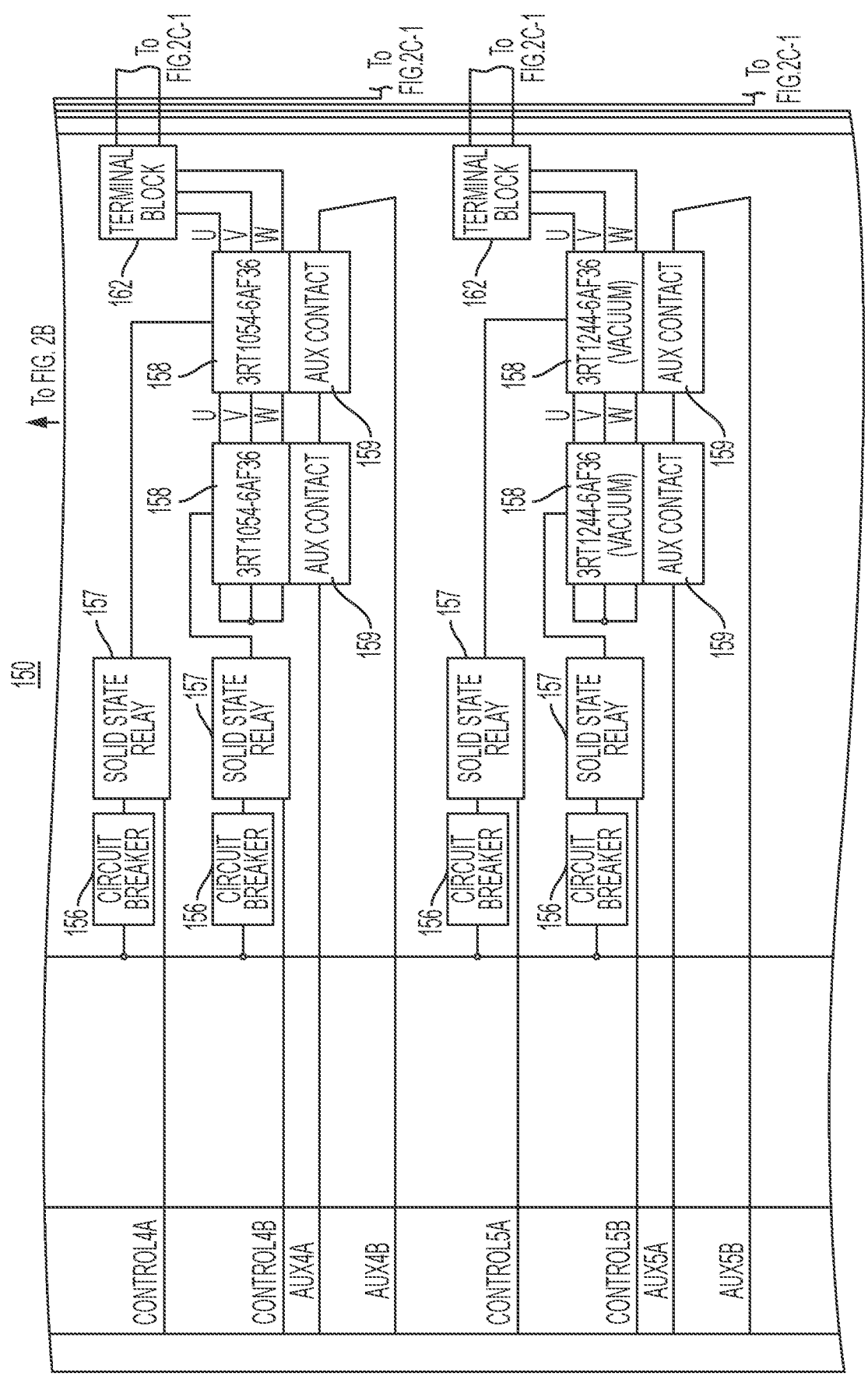

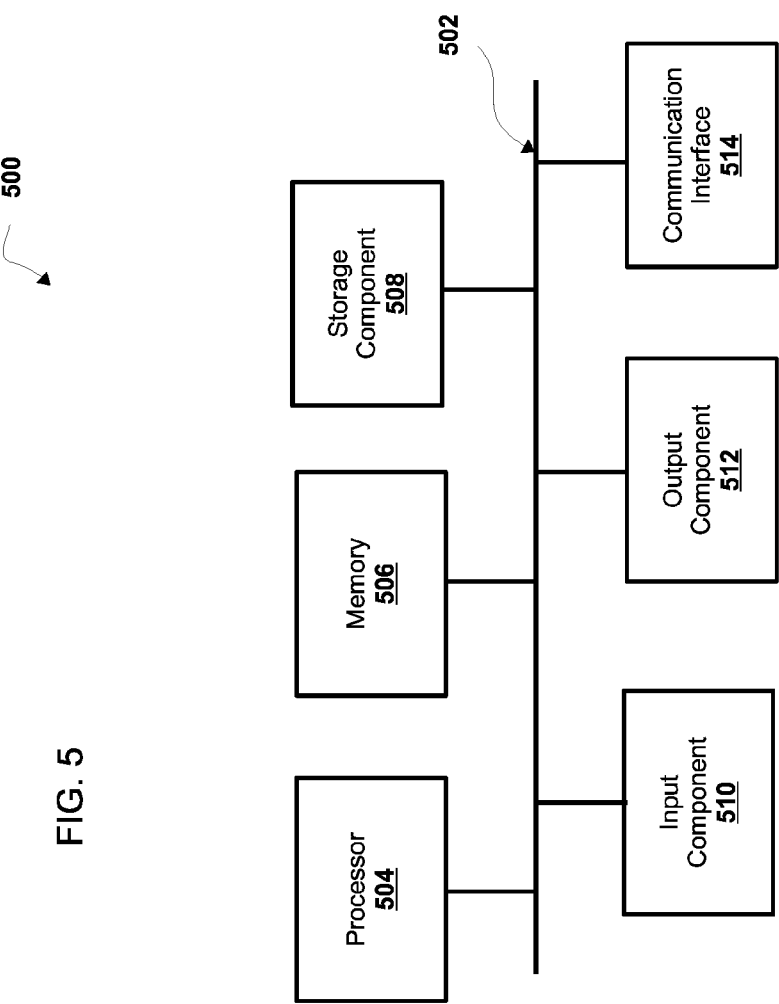

USING LINEAR SYNCHRONOUS MOTORS FOR RETARDING LINEAR MOTION AND CONVEYING SYSTEMS

CROSS-REFERENCE TO RELATED APPLICATIONS

This application is the United States national phase of International Application No. PCT/US2018/055400 filed Oct. 11, 2018, and claims priority to U.S. Provisional Patent Application No. 62/571,008 filed Oct. 11, 2017, the disclosures of which are hereby incorporated by reference in their entireties.

BACKGROUND

1. Field

This disclosed subject matter relates generally to systems and methods for reducing velocity of a conveyance and, in some particular embodiments, to systems and methods for reducing velocity of a conveyance using shunted linear motors.

2. Technical Considerations

In certain situations, it may be desirable to retard (e.g., slow down, stop, and/or the like) the motion (e.g., speed, velocity, and/or the like) of a conveyance (e.g., a vehicle, a carrier, and/or the like). For example, the conveyance may be on a track along which the conveyance may be moved (e.g., trains, people movers, amusement rides, conveyor systems, industrial/manufacturing systems, automation systems, and/or the like). Additionally or alternatively, the conveyance may not be confined to a track and/or may be capable of movement independent of a track. For example, such a conveyance may be controlled to move around a confined space, such as a hallway, warehouse, manufacturing facility, and/or the like. Mechanical brakes may be used to retard the motion of such a conveyance, e.g., using contacting parts, moving parts, friction, and/or the like.

However, such mechanical brakes may wear and/or deteriorate the conveyance and/or parts thereof. For example, moving parts contacting mechanical brakes may cause wear and/or deterioration of such moving parts. Further, as mechanical brakes and/or parts contacted by such mechanical brakes are worn, the performance of braking may degrade over time. Additionally, the friction generated by such contact may produce heat. Such heat may result in a loss of energy (e.g., kinetic energy). Moreover, such heat may be damaging to the conveyance and/or parts thereof.

SUMMARY

Accordingly, it is an object of the presently disclosed subject matter to provide systems and methods for reducing velocity of a conveyance, e.g., reducing velocity of a conveyance using shunted linear motors.

According to non-limiting embodiments, provided is a system for reducing velocity of a conveyance. In some non-limiting embodiments, a system for reducing velocity of a conveyance may include a conveyance. A first member of a linear motor may be attached to the conveyance. A second member of the linear motor may include stator coils. The second member may be separate from the first member and/or separate from the conveyance. The first member may be moveable relative to the second member. A current-interrupting device may be configured to selectively shunt at least two coil wires of the stator coils by shorting (e.g., closing an electrical connection between) the at least two coil wires.

In some non-limiting embodiments, the current interrupting device may include at least one of a contactor, a thyristor, or a combination thereof. In some non-limiting embodiments, a velocity of the conveyance may be reduced upon the first member moving relative to the second member while the current interrupting device shunts the at least two coil wires of the stator coils. Additionally or alternatively, an induced current in the stator coils may be induced/caused by the first member moving relative to the second member, and the induced current may be drained through a short circuit loop comprising the at least two coil wires when shunted. In some non-limiting embodiments, the current-interrupting device may be configured to correspond to a maximum desired current of the induced current.

In some non-limiting embodiments, the first member may include a linear permanent magnet carrier, and the second member may include a stator. Additionally or alternatively, motion of the linear permanent magnet carrier relative to the stator may induce an induced current in the stator coils of the stator.

In some non-limiting embodiments, power connections may be coupled to the stator coils. Additionally or alternatively, the stator coils may have a first resistance and the power connections may have a second resistance. In some non-limiting embodiments, the stator coils and the power connections may combine to have a combined resistance. Additionally or alternatively, the combined resistance of the stator coils and the power connections may result in reducing the velocity of the first member and the conveyance upon the first member moving relative to the second member while the current interrupting device shunts the at least two coil wires of the stator coils.

In some non-limiting embodiments, the current-interrupting device may be configured to selectively open an electrical connection between the at least two coil wires when not selectively shunting the at least two coil wires.

According to non-limiting embodiments, provided is a method for reducing velocity of a conveyance. In some non-limiting embodiments, a method for reducing velocity of a conveyance may include moving a first member of a linear motor relative to a second member of the linear motor. The first member may be attached to a conveyance. The second member may include stator coils. The second member may be separate from the first member and/or separate from the conveyance. At least two coil wires of the stator coils may be shunted by shorting (e.g., closing an electrical connection between) the coil wires. An induced current may be induced in the stator coils by moving the first member relative to the second member while the coil wires are shunted.

In some non-limiting embodiments, shunting the coil wires may include shunting the coil wires using a current-interrupting device. In some non-limiting embodiments, the first member may include a linear permanent magnet carrier, and the second member may include a stator.

In some non-limiting embodiments, a velocity of the conveyance may be reduced by inducing the current in the stator coils by moving the first member relative to the second member while the at least two coil wires are shunted. In some non-limiting embodiments, the induced current may be drained through a short circuit loop comprising the coil wires when shunted.

In some non-limiting embodiments, an electrical connection between the coil wires may be opened when not shunting the at least two coil wires.

According to non-limiting embodiments, provided is a method for making a system for reducing velocity of a conveyance. In some non-limiting embodiments, a method for making a system for reducing velocity of a conveyance may include attaching a first member of a linear motor to a conveyance. A second member of the linear motor may include stator coils. The second member may be separate from the first member and/or separate from the conveyance. The first member may be moveable relative to the second member. A current-interrupting device may be coupled to the second member. The current-interrupting device may be configured to selectively shunt at least two coil wires of the stator coils by shorting (e.g., closing an electrical connection between) the at least two coil wires.

In some non-limiting embodiments, the current-interrupting device comprises at least one of a contactor, a thyristor, or a combination thereof. Additionally or alternatively, the current-interrupting device may be configured to correspond to a maximum desired current of an induced current caused by the first member moving relative to the second member. In some non-limiting embodiments, the current-interrupting device may be configured to selectively open an electrical connection between the at least two coil wires when not selectively shunting the at least two coil wires.

In some non-limiting embodiments, the first member may include a linear permanent magnet carrier, and the second member may include a stator. In some non-limiting embodiments, power connections may be coupled to the stator coils.

Further embodiments are set forth in the following numbered clauses:

Clause 1: A system for reducing velocity of a conveyance, comprising: a conveyance; a first member of a linear motor attached to the conveyance; a second member of the linear motor, the second member comprising stator coils, the second member separate from the first member and separate from the conveyance, the first member moveable relative to the second member; and a current-interrupting device configured to selectively shunt at least two coil wires of the stator coils by shorting the at least two coil wires.

Clause 2: The system of clause 1, wherein the current interrupting device comprises at least one of a contactor, a thyristor, or a combination thereof.

Clause 3: The system of clauses 1 or 2, wherein a velocity of the conveyance is reduced upon the first member moving relative to the second member while the current-interrupting device shunts the at least two coil wires of the stator coils.

Clause 4: The system of any preceding clause, wherein an induced current in the stator coils caused by the first member moving relative to the second member is drained through a short circuit loop comprising the at least two coil wires when shunted.

Clause 5: The system of any preceding clause, wherein the current-interrupting device is configured to correspond to a maximum desired current of the induced current.

Clause 6: The system of any preceding clause, wherein the first member comprises a linear permanent magnet carrier, wherein the second member comprises a stator.

Clause 7: The system of any preceding clause, wherein motion of the linear permanent magnet carrier relative to the stator induces an induced current in the stator coils of the stator.

Clause 8: The system of any preceding clause, further comprising power connections coupled to the stator coils, wherein the stator coils have a first resistance and the power connections have a second resistance, wherein the stator coils and the power connections combine to have a combined resistance.

Clause 9: The system of any preceding clause, wherein the combined resistance of the stator coils and the power connections results in reducing the velocity of the first member and the conveyance upon the first member moving relative to the second member while the current-interrupting device shunts the at least two coil wires of the stator coils.

Clause 10: The system of any preceding clause, wherein the current-interrupting device is further configured to selectively open an electrical connection between the at least two coil wires when not selectively shunting the at least two coil wires.

Clause 11: A method for reducing a velocity of a conveyance, comprising: moving a first member of a linear motor relative to a second member of the linear motor, the first member attached to a conveyance, the second member comprising stator coils, the second member separate from the first member and separate from the conveyance; shunting at least two coil wires of the stator coils by shorting the at least two coil wires; and inducing an induced current in the stator coils by moving the first member relative to the second member while the at least two coil wires are shunted.

Clause 12: The method of clause 11, wherein shunting the at least two coil wires comprises shunting the at least two coil wires using a current-interrupting device.

Clause 13: The method of clauses 11 or 12, wherein a velocity of the conveyance is reduced by inducing the current in the stator coils by moving the first member relative to the second member while the at least two coil wires are shunted.

Clause 14: The method of any one of clauses 11-13, further comprising draining the induced current through a short circuit loop comprising the at least two coil wires when shunted Clause 15: The method of any one of clauses 11-14, wherein the first member comprises a linear permanent magnet carrier, wherein the second member comprises a stator.

Clause 16: The method of any one of clauses 11-15, further comprising opening an electrical connection between the at least two coil wires when not shunting the at least two coil wires.

Clause 17: A method of making a system for reducing a velocity of a conveyance, comprising: attaching a first member of a linear motor to a conveyance; providing a second member of the linear motor comprising stator coils, the second member separate from the first member and separate from the conveyance, the first member moveable relative to the second member; and coupling a current-interrupting device to the second member, the current-interrupting device configured to selectively shunt at least two coil wires of the stator coils by shorting the at least two coil wires.

Clause 18: The method of clause 17, wherein the current-interrupting device comprises at least one of a contactor, a thyristor, or a combination thereof.

Clause 19: The method of clauses 17 or 18, wherein the current-interrupting device is configured to correspond to a maximum desired current of an induced current caused by the first member moving relative to the second member.

Clause 20: The method of any one of clauses 17-19, wherein the first member comprises a linear permanent magnet carrier, wherein the second member comprises a stator.

Clause 21: The method of any one of clauses 17-20, further comprising coupling power connections to the stator coils.

Clause 22: The method of any one of clauses 17-21, wherein the current-interrupting device is further configured to selectively open an electrical connection between the at least two coil wires when not selectively shunting the at least two coil wires.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIG. 1 is a schematic diagram of a non-limiting embodiment of a system for reducing velocity of a conveyance according to the principles of the presently disclosed subject matter;

FIGS. 2A-2D-1 are schematic diagrams showing further details of a non-limiting embodiment of certain components of the system of FIG. 1 according to the principles of the presently disclosed subject matter;

FIG. 5 is a diagram of a non-limiting embodiment of components of one or more controllers for a system for optical sensing according to the principles of the presently disclosed subject matter.

DESCRIPTION

Figure 2A:
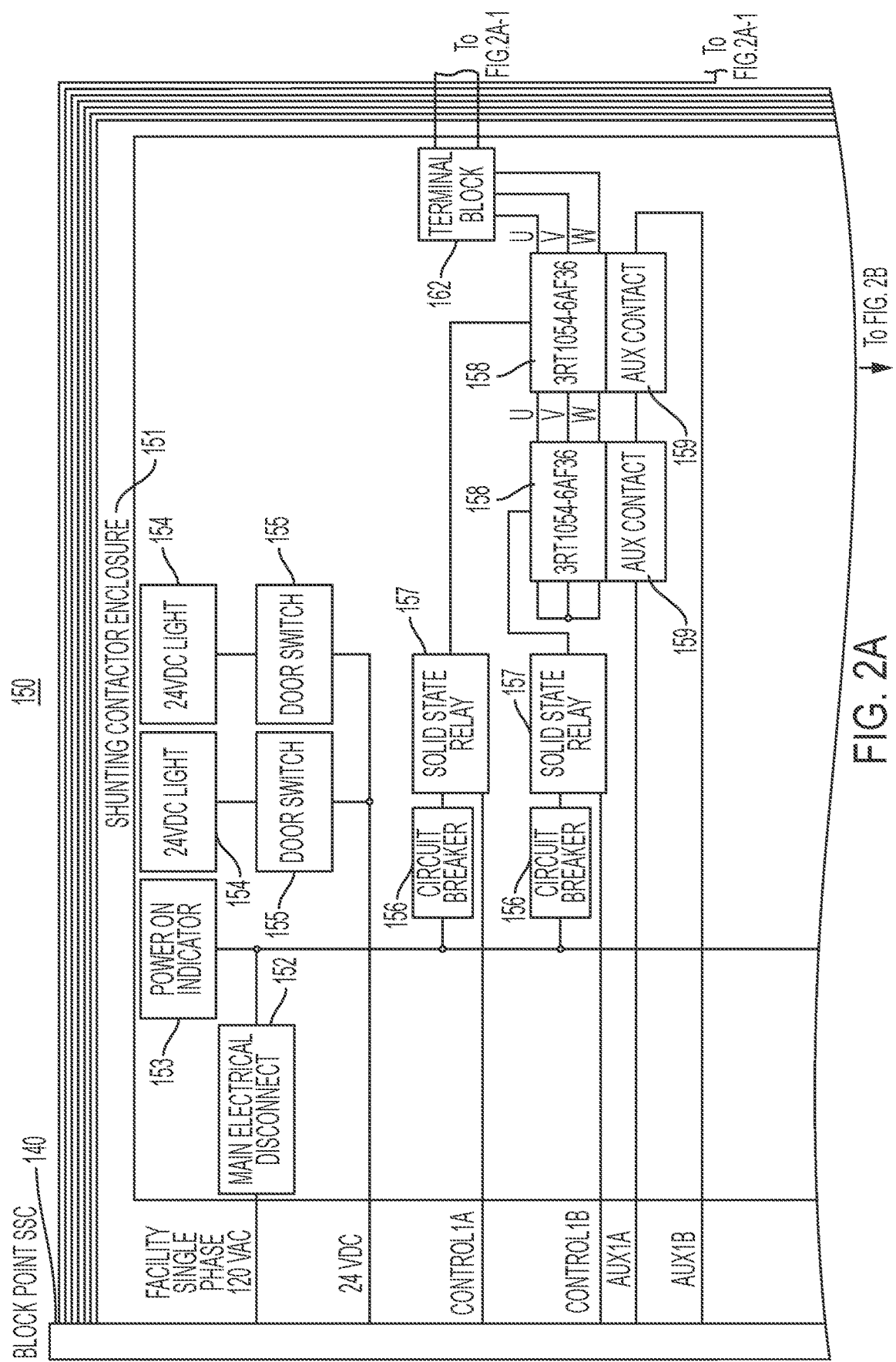
Figure 2B:
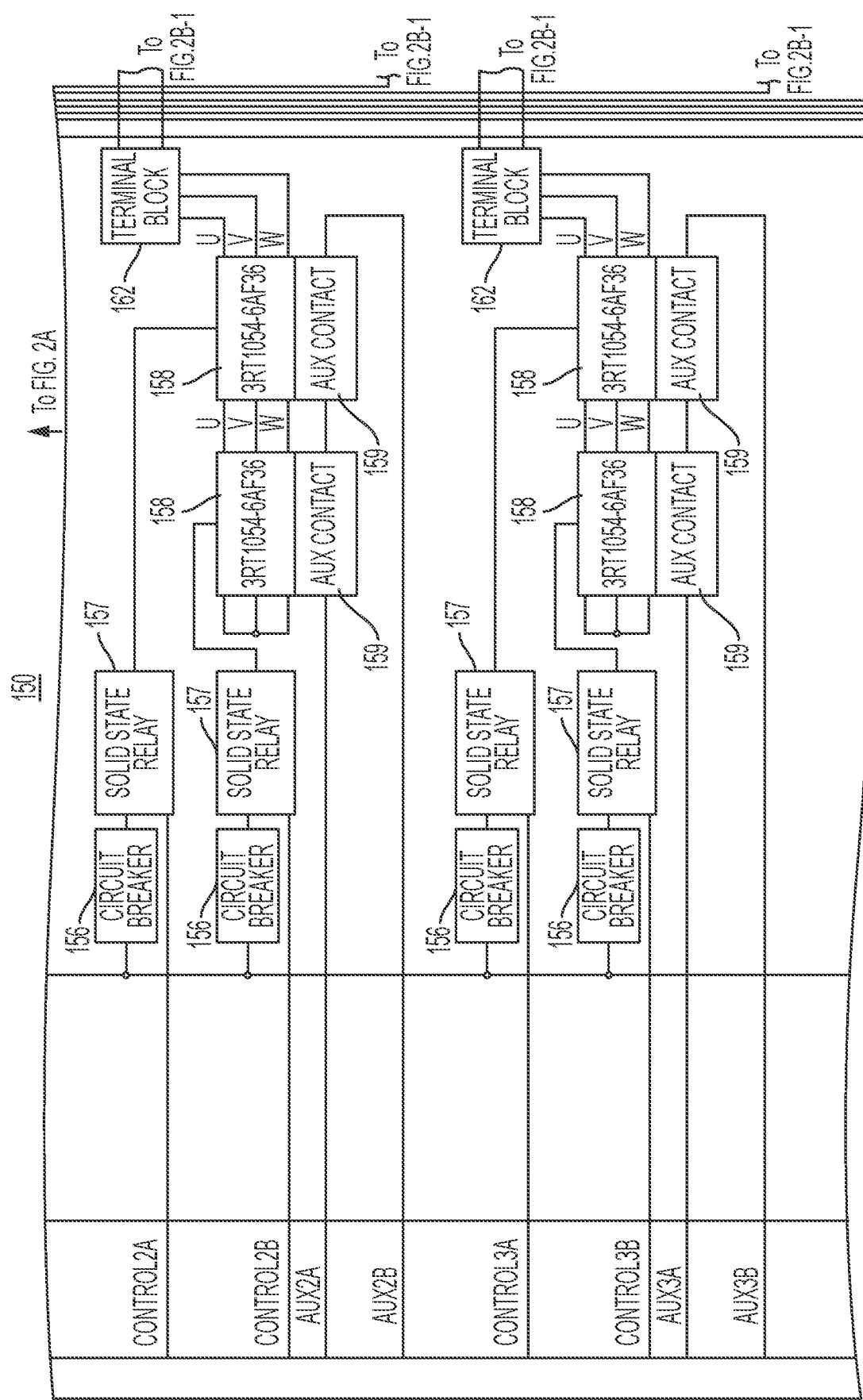

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Non-limiting embodiments of the disclosed subject matter are directed to systems and methods for reducing velocity of a conveyance, including, but not limited to, reducing velocity of a conveyance using shunted linear motors. For example, non-limiting embodiments of the disclosed subject matter provide a conveyance attached to a first member (e.g., linear permanent magnet carrier) of a linear motor and a separate second member (e.g., stator) of the linear motor comprising stator coils, which includes at least two coil wires that may be shunted (e.g., by shorting/closing an electrical connection between such coil wires) to, therefore, create a short circuit loop that can drain an induced current from motion of the first member relative to the second member, thereby reducing velocity (e.g., braking) of the first member and conveyance. Such embodiments provide techniques and systems for precise (e.g., fine tuned and/or tunable), repeatable, and reliable braking without using any contacting parts, moving parts, mechanical friction, and/or the like. For example, such techniques and systems may provide unexpected and superior results (e.g., compared to mechanical brakes) and may allow for braking without mechanical wear and/or deterioration of the conveyance and/or parts thereof. Additionally or alternatively, such braking may be perfectly or near perfect repeatable (e.g., with the same or substantially similar precision braking, without substantial degradation over time). Additionally or alternatively, such braking may produce no or substantially less friction (e.g., compared to mechanical brakes), which may prevent loss of energy to heat and/or may prevent damage to the conveyance and/or parts thereof from such heating. For example, such techniques and systems may be used in the amusement ride industry (e.g., for roller coasters and/or the like) and may allow for relatively precise, repeatable, and reliable braking of conveyances of amusement rides. Additionally or alternatively, such techniques and systems may be used for transportation (e.g., trains, commuter trains, cargo trains, people movers, automobiles, and/or the like), automotive industries (e.g., destructive testing and/or the like), defense industries, warehousing/inventory management, manufacturing industries (e.g., moving conveyances carrying workpieces to different portions of an assembly line, manufacturing cell(s), and/or the like), any industry suitable for moving conveyances (e.g., vehicles, carriers, carriages, harnesses, and/or the like) with precise reduction of motion, and/or the like.

For the purpose of illustration, in the following description, while the presently disclosed subject matter is described with respect to systems and methods for reducing velocity of a conveyance, e.g., using shunted linear motors, one skilled in the art will recognize that the disclosed subject matter is not limited to the illustrative embodiments. For example, the systems and methods described herein may be used with a wide variety of settings, such as reducing velocity of a conveyance in any setting suitable for using such features, e.g., a conveyance (e.g., vehicle, carrier, carriage, harness, and/or the like) on a track, independent of a track, and/or in a confined space (e.g., a warehouse, a manufacturing facility, and/or the like).

Figures 1, 2C:
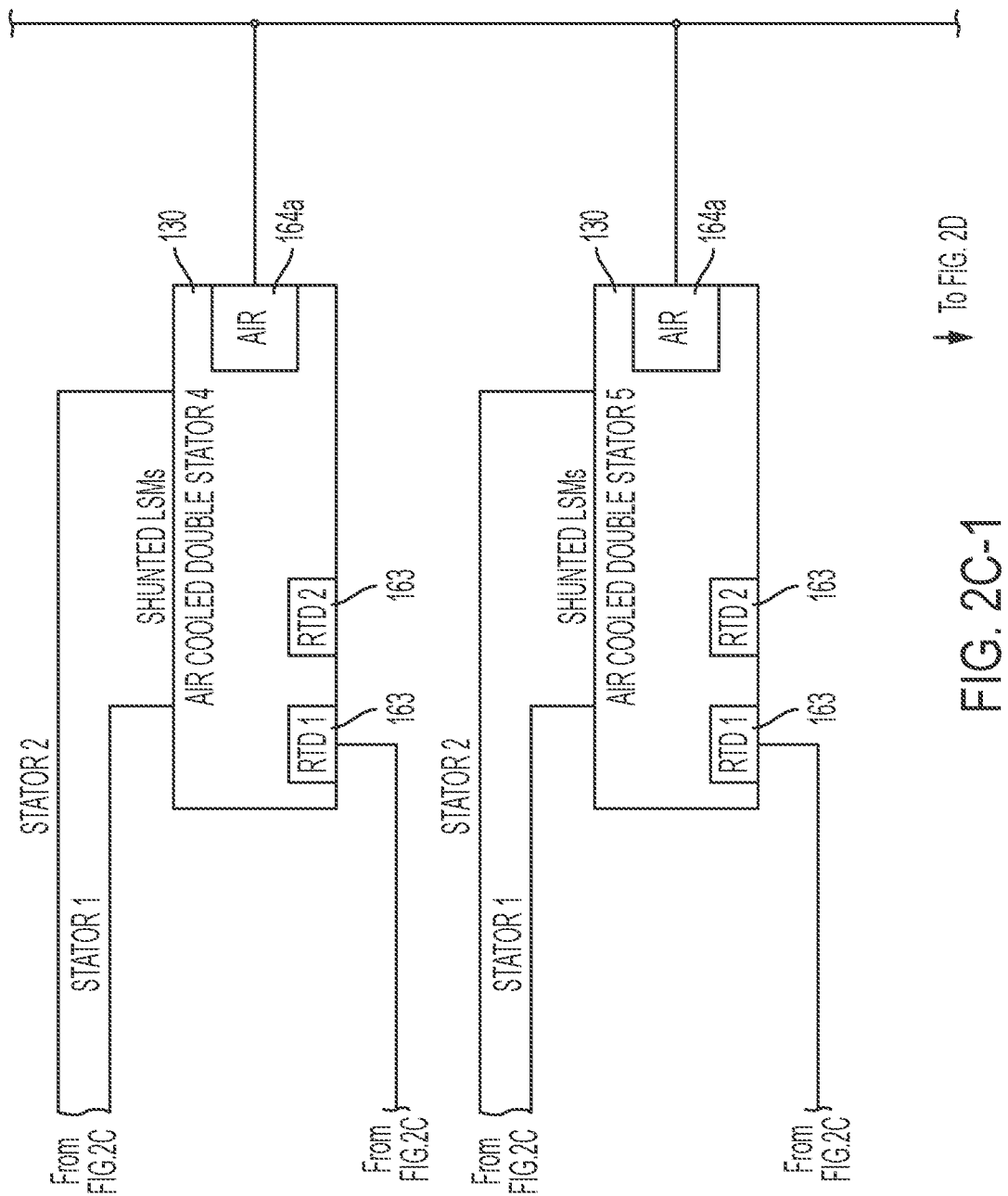

Referring now to FIG. 1, FIG. 1 is a diagram of a non-limiting embodiment of a system for reducing velocity of a conveyance. As shown in FIG. 1, system 100 may include a linear motor having a first member (e.g., linear permanent magnet carrier 120 and/or the like) and a second member (e.g., stator 130 and/or the like). In some non-limiting embodiments, the first member (e.g., linear permanent magnet carrier 120 and/or the like) may be movable relative to the second member (e.g., stator 130 and/or the like). Additionally or alternatively, the first member (e.g., linear permanent magnet carrier 120 and/or the like) may be separate from the second member (e.g., stator 130 and/or the like). In some non-limiting embodiments, linear permanent magnet carrier 120 may be the same as or similar to a rotor of a round/cylindrical electric motor, except that linear permanent magnet carrier 120 may be arranged (e.g., the permanent magnets may be arranged) linearly rather than circularly/annularly. In some non-limiting embodiments, linear permanent magnet carrier 120 may include at least two permanent magnets. For example, the permanent magnets may be arranged in alternating polarity. Additionally or alternatively, permanent magnets may be attached to back plates, which may be attached to the linear permanent magnet carrier 120. In some non-limiting embodiments, stator 130 may include stator coil(s) (e.g., included and/or embedded within stator 130). For example, stator coils may include one or more coil wires (e.g., coils of conductive material, electrical wiring, and/or the like). In some non-limiting embodiments, the stator coils may induce a magnetic field when electrical current runs through such stator coils. Additionally or alternatively, an electrical current (e.g., induced current) may be induced in the stator coils in response to a changing/moving magnetic field (e.g., upon movement of linear permanent magnet carrier 120 relative to stator 130 and/or the like).

In some non-limiting embodiments, the linear motor may be (or include) a linear synchronous motor (LSM), a linear induction motor (LIM), and/or the like. In some non-limiting embodiments, the linear motor may be the same as or similar to the linear motors described in U.S. Pat. No. 6,930,413, filed May 23, 2003, and issued Aug. 16, 2005, U.S. Pat. No. 8,727,078, filed Feb. 16, 2005, and issued May 20, 2014, U.S. patent application Ser. No. 14/505,476 (now U.S. Pat. No. 10,046,644), filed Oct. 2, 2014, and issued Aug. 14, 2018, and International Patent Application No. PCT/US2018/050259, filed Sep. 10, 2018, which are hereby incorporated by reference herein in their entirety. Additionally or alternatively, the linear motor may include at least one stator 130 and at least one linear permanent magnet carrier 120.

In some non-limiting embodiments, conveyance 110 (e.g., a vehicle, a carrier, and/or the like) may be attached and/or disposed with the first member (e.g., linear permanent magnet carrier 120 and/or the like). Additionally or alternatively, conveyance 110 may be separate from and/or unattached to the second member (e.g., stator 130 and/or the like). In some non-limiting embodiments, the second member (e.g., stator 130 and/or the like) may be attached to one or more tracks, one or more portions of a track, and/or the like. Additionally or alternatively, the second member (e.g., stator 130 and/or the like) may be disposed at a selected location within a confined space (e.g., a hallway, a warehouse, a manufacturing facility, and/or the like).

In some non-limiting embodiments, conveyance 110 may be attached and/or disposed with the second member (e.g., stator 130 and/or the like). Additionally or alternatively, conveyance 110 may be separate from and/or unattached to the first member (e.g., linear permanent magnet carrier 120 and/or the like).

In some non-limiting embodiments, the second member (e.g., stator 130 and/or the like) of the linear motor may be coupled to (e.g., electrically connected with and/or the like) electrical components 150. For example, electrical components 150 may include a current-interrupting device, power connections (e.g., power cables, a power cabinet, and/or the like), electrical devices, electrical circuitry, and/or the like. In some non-limiting embodiments, electrical components 150 may include the electrical components further described below with regard to FIGS. 2A-2D-1.

In some non-limiting embodiments, system 100 may include controller 140 (e.g., any suitable controller, such as controller 500 further described below with regard to FIG. 5). For example, the controller may be coupled to (e.g., electronically connected to and/or the like) electrical components 150 and/or the second member of the linear motor (e.g., stator 130). In some non-limiting embodiments, the controller may control electrical components 150 (e.g., a current-interrupting device and/or the like) and/or the second member of the linear motor (e.g., stator 130) to selectively shunt stator coils (e.g., at least two coil wires of the stator coils and/or the like) to reduce velocity of conveyance 110 and/or the first member of the linear motor (e.g., linear permanent magnet carrier 120). Additionally or alternatively, controller 140 may control electrical components 150 (e.g., a current-interrupting device and/or the like) and/or the second member of the linear motor (e.g., stator 130) to open the circuit of the stator coils (e.g., at least two coil wires of the stator coils and/or the like) such that such stator coils are not shunted and will not reduce velocity of conveyance 110 and/or the first member of the linear motor (e.g., linear permanent magnet carrier 120).

In some non-limiting embodiments, controller 140 may control the linear motor (e.g., stator 130 and/or linear permanent magnet carrier 120) to move conveyance 110 (e.g., move linear permanent magnet carrier 120 attached to conveyance 110) into a desired position and/or at a desired speed. For example, the controller may supply current to stator coils of stator 130 and/or cause electrical components 150 to supply current to stator coils of stator 130. Additionally or alternatively, controller 140 may increase, decrease, or stop supplying current (or cause electrical components 150 to increase, decrease, or stop supplying current) to stator coils of stator 130, change the timing that current is supplied to stator coils of stator 130, and/or the like to change the position, velocity, and/or the like of conveyance 110 (e.g., linear permanent magnet carrier 120 attached to conveyance 110). Additionally or alternatively, controller 140 may open, close, shunt, and/or the like at least a portion of a circuit interconnecting the stator coils (e.g., at least two coil wires of such stator coils).

In some non-limiting embodiments, conveyance 110 may be attached to a first member of a linear motor, and a second member of the linear motor may be separate from conveyance 110 and the first member. For example, conveyance 110 may be attached to linear permanent magnet carrier 120 of a linear motor, and at least one stator 130 of the linear motor may be separate from conveyance 110 and linear permanent magnet carrier 120. Additionally or alternatively, linear permanent magnet carrier 120 (and conveyance 110 attached thereto) may be moveable relative to stator 130. In some non-limiting embodiments, stator 130 may be stationary. For example, stator 130 may be disposed proximate (e.g., integrated with, parallel to, and/or the like) a track. Additionally or alternatively, conveyance 110 may move/travel linearly on the track. In some non-limiting embodiments, stator 130 may include stator coils. In some non-limiting embodiments, a current-interrupting device (e.g., electrical components 150, controller 140, and/or the like) may selectively shunt at least two coil wires of the stator coils by shorting (e.g., closing an electrical connection between) the at least two coil wires.

In some non-limiting embodiments, a plurality (e.g., a row, an array, and/or the like) of stators 130 may be arranged proximate (e.g., integrated with, parallel to, and/or the like) a track and/or parallel to a direction of motion/travel of conveyance 110. In some non-limiting embodiments, a single stator 130 may be used to effect the speed reduction, as described herein.

In some non-limiting embodiments, unlike a rotary (e.g., round, cylindrical, and/or the like) motor that may pair (e.g., connect physically, electrically, and/or the like) a stator and a rotor, stator(s) 130 may be unpaired from linear permanent magnet carrier 120, so that linear permanent magnet carrier 120 may be (entirely) separate from stator 130 region (e.g., physically, electrically, and/or the like). In some non-limiting embodiments, stator 130 may be positioned wayside along a track and/or positioned parallel to the direction of motion of at least one linear permanent magnet carrier 120, which can be affixed to conveyance 110. Additionally or alternatively, linear permanent magnet carrier 120 may include permanent magnets, and linear permanent magnet carrier 120 may be attached to a moving structure (e.g., conveyance 110). As such, linear permanent magnet carrier 120 may be a moving portion of a linear motor. In some non-limiting embodiments, linear permanent magnet carrier 120 may interact with a plurality of shunted stators 130 along a path (e.g., a linear path, such as a track and/or the like). Additionally or alternatively, stator(s) 130 may be positioned at various locations along the path (e.g., a track and/or the like).

In some non-limiting embodiments, the current-interrupting device (e.g., electrical components 150, controller 140, and/or the like) may include at least one of a contactor, a thyristor, any combination thereof, and/or the like. In some non-limiting embodiments, stator 130 may include stator coils. Additionally or alternatively, during operation, the stator coils (e.g., at least two coil wires of the stator coils) may be shunted, such that coil wire(s) are shorted together in a closed loop-type configuration. For example, such shunting may be accomplished by utilizing wiring (e.g., coil wires, electrical wires connected to coil wires, and/or the like) in conjunction with a current-interrupting device (e.g., electrical components 150, controller 140, and/or the like). In some non-limiting embodiments, the current-interrupting device (e.g., electrical components 150, controller 140, and/or the like) may include at least one of a contactor, a high speed contactor, a thyristor, any other device that may interrupt current, any combination thereof, and/or the like. Additionally or alternatively, the current-interrupting device may be located in a shunting contactor enclosure (e.g., electrically connected to the coil wires and/or the like). In some non-limiting embodiments, multiple (e.g., a plurality of) current-interrupting devices may be used. In some non-limiting embodiments, at least one current-interrupting device may be configured to quickly interrupt current. For example, the current-interrupting device(s) may control whether the stator coils are either electrically open (e.g., not connected) or shunted/electrically closed (e.g., in a short circuit-type loop). When the current-interrupting device(s) shunt/close the coil wires (e.g., in a short circuit-type loop), induced current (e.g., from motion of linear permanent magnet carrier 120 relative to stator 130) may flow from the stator coils to drain through the short/closed circuit loop. In some non-limiting embodiments, the short/closed circuit loop may be configured to allow a predetermined current (e.g., a maximum desired current). For example, the current-interrupting device (e.g., electrical components 150, controller 140, and/or the like) may be configured (e.g., sized, designed, selected, adjusted, and/or the like) to correspond to the predetermined current (e.g., a maximum desired current) of the induced current.

In some non-limiting embodiments, power connections (e.g., electrical components 150, a portion thereof, and/or the like) may be coupled to the stator coils (e.g., of stator 130). Additionally or alternatively, the stator coils (e.g., of stator 130) may have a first resistance and the power connections (e.g., electrical components 150, a portion thereof, and/or the like) may have a second resistance. In some non-limiting embodiments, the stator coils (e.g., of stator 130) and the power connections (e.g., electrical components 150, a portion thereof, and/or the like) may combine to have a combined resistance. In some non-limiting embodiments, the combined resistance of the stator coils (e.g., of stator 130) and the power connections (e.g., electrical components 150, a portion thereof, and/or the like) may result in reducing the velocity of the first member (e.g., linear permanent magnet carrier 120) of the linear motor and conveyance 110 upon the first member moving relative to the second member (e.g., stator 130) of the linear motor while the current-interrupting device (e.g., electrical components 150, controller 140, and/or the like) shunts the at least two coil wires of the stator coils.

In some non-limiting embodiments, when coil wires of stator 130 are shunted, the motion of linear permanent magnet carrier 120 (and conveyance 110 attached thereto) moving relative to (e.g., passing by) stator 130 may induce current (e.g., high current) in the stator coils. Additionally or alternatively, the resistance of the stator coils (e.g., of stator 130) and/or power connections (e.g., electrical components 150 and/or portions thereof, such as power cables connecting the stator coils to a power cabinet, and/or the like) may result in braking (e.g., reducing the speed of linear permanent magnet carrier 120 and conveyance 110 attached thereto).

In some non-limiting embodiments, the current-interrupting device (e.g., electrical components 150, controller 140, and/or the like) may be configured to selectively open an electrical connection. For example, the current-interrupting device (e.g., electrical components 150, controller 140, and/or the like) may open the electrical connection between the at least two coil wires of the stator coils (e.g., of stator 130) when not selectively shunting the at least two coil wires. In some non-limiting embodiments, when current-interrupting device(s) (e.g., electrical components 150 such as contactors, controller 140, and/or the like) are used to effectuate the shunting, when the current-interrupting device(s) are opened, current may no longer flow, and the braking force may be instantly removed (e.g., within milliseconds or less). In some non-limiting embodiments, the control and monitoring of the current-interrupting device(s) may be accomplished using controller 140.

In some non-limiting embodiments, unlike the linear motors for launching (e.g., launch LSMs, such as those contained in U.S. patent application Ser. No. 14/505,476, which is incorporated by reference herein in its entirety), shunted linear motors may include predominately passive type equipment and/or may not require a high power electrical power feed. In some embodiments, shunted linear motors may act similar to a generator, with voltage and current only being created when linear permanent magnet carrier 120 passes through a region of stator 130.

In some non-limiting embodiments, the geometry of stator coils (e.g., of stator 130), the size and strength of permanent magnets (e.g., of linear permanent magnet carrier 120), the associated linear permanent magnet carrier 120/stator 130 air gap, and the velocity/speed of a vehicle entering a region of stator 130 may determine the amount of current that will be induced/generated. Additionally or alternatively, velocity/speed reduction (e.g., braking forces) may be determined (e.g., developed, applied, selected, and/or the like) accordingly.

In some non-limiting embodiments, system 100 may further include a mechanical brake. For example, conveyance 110 may be traveling at a velocity/speed that is higher than desired for shunted braking (e.g., shunting coil wires of stator 130) alone when conveyance 110 enters a region of stator(s) 130. Additionally or alternatively, a mechanical brake may be used in combination with shunted braking (e.g., shunting coil wires of stator 130) to slow conveyance 110 to a first velocity/speed (e.g., predetermined, selected, and/or the like) or to a complete stop. In some non-limiting embodiments, when conveyance 110 is moving/traveling at a speed that is slower than a second speed (e.g., predetermined, selected, and/or the like) when entering a region of stator 130, the shunting braking (e.g., shunting coil wires of stator 130) may be disabled.

The number and arrangement of systems, devices, and/or components shown in FIG. 1 is provided as an example. There may be additional systems, devices, and/or components; fewer systems, devices, and/or components; different systems, devices, and/or components; and/or differently arranged systems, devices, and/or components than those shown in FIG. 1. Furthermore, two or more devices or components shown in FIG. 1 may be implemented within a single device or component, or a single device or component shown in FIG. 1 may be implemented as multiple, distributed devices or components. Additionally or alternatively, a set of devices (e.g., one or more devices) or a set of components (e.g., one or more components) of system 100 may perform one or more functions described as being performed by another set of devices or another set of components of system 100.

Referring now to FIGS. 2A-2D-1, FIGS. 2A-2D-1 are schematic diagrams showing further details of a non-limiting embodiment of certain components of the system of FIG. 1. As shown in FIGS. 2A-2D-1, a system may include controller 140 and electrical components 150 (e.g., including components 152-159 and 162-164, as further described below). Additionally or alternatively, controller 140, electrical components 150, and/or a portion thereof may be coupled (e.g., electrically connected) to at least one stator 130. In some non-limiting embodiments, controller 140, electrical components 150, and/or a portion thereof may be enclosed in an enclosure 151 (e.g., shunting contactor enclosure, a power cabinet, and/or the like).

In some non-limiting embodiments, controller 140 may be any suitable controller, such as controller 500 further described below with regard to FIG. 5. Additionally or alternatively, controller 140 may be a sub-system controller (SSC), a Setpoint SSC, a block point SSC, and/or the like.

In some non-limiting embodiments, electrical components 150 may include main electrical connection/disconnect 152. For example, such main electrical connection/disconnect 152 may be connected to a power supply (e.g., power grid, facility power supply, 120 volt alternating current (VAC) single phase power, and/or the like). Additionally or alternatively, an indicator 153 (e.g., a light, light emitting diode, and/or the like) may indicate that the power is on and/or electricity is connected. In some non-limiting embodiments, at least one light 154 (e.g., a light such as a 24 volt direct current (VDC) light, a light emitting diode, and/or the like) may be included (e.g., to illuminate enclosure 151). For example, light(s) 154 may be connected to suitable power (e.g., 24 VDC and/or the like). Additionally or alternatively, light(s) 154 may be attached to switches 155 (e.g., door switch(es), light switch(es), and/or the like).

In some non-limiting embodiments, main electrical connection/disconnect 152 may be connected to at least one circuit breaker 156. Additionally or alternatively, controller 140 may be connected to at least one solid state relay (SSR) 157. Additionally or alternatively, circuit breaker(s) 156 may be connected to SSR(s) 157.

In some non-limiting embodiments, SSR(s) 157 may be connected to at least one current-interruption device 158. For example, current-interruption device(s) 158 may be any suitable current-interrupting device, e.g., a contactor (e.g., a Siemens 3RT1054-6AF36 pole contactor), a thyristor, any other device that may interrupt current, any combination thereof, and/or the like. In some non-limiting embodiments, controller 140 may be connected to current-interruption device(s) 158, either directly or via auxiliary connections/contacts 159. In some non-limiting embodiments, at least some current-interruption devices 158 may be connected to each other.

In some non-limiting embodiments, at least some current-interruption device(s) 158 may be connected to terminal block 162. Additionally or alternatively, terminal block 162 may connect to stator(s) 130 (e.g., coil wires of stator coils of stator(s) 130).

In some non-limiting embodiments, stator(s) 130 may include at least one temperature sensor 163 (e.g., resistance temperature device (RTD), thermometer, thermocouple, and/or the like). Additionally or alternatively, temperature sensor(s) 163 may be connected to controller 140. In some non-limiting embodiments, a coolant control device 164 (e.g., air cooling pneumatic control panel, liquid cooling control panel, and/or the like) may provide coolant medium 164a (e.g., air, liquid, and/or the like) to stator(s) 130. In some non-limiting embodiments, coolant medium 164a may be provided by the coolant control device 164 based on the temperature sensed by the temperature sensor(s) 163. Additionally or alternatively, coolant control device 164 may be connected to controller 140, which may provide signals and/or data associated with temperature sensor(s) 163 to coolant control device 164.

The number and arrangement of systems, devices, and/or components shown in FIGS. 2A-2D-1 are provided as an example. There may be additional systems, devices, and/or components; fewer systems, devices, and/or components; different systems, devices, and/or components; and/or differently arranged systems, devices, and/or components than those shown in FIGS. 2A-2D-1. Furthermore, two or more devices or components shown in FIGS. 2A 2A-2D-1 may be implemented within a single device or component, or a single device or component shown in FIGS. 2A-2D-1 may be implemented as multiple, distributed devices or components. Additionally or alternatively, a set of devices (e.g., one or more devices) or a set of components (e.g., one or more components) of the system shown in FIGS. 2A-2D-1 may perform one or more functions described as being performed by another set of devices or another set of components of the system shown in FIGS. 2A-2D-1.

In some non-limiting embodiments, a plurality of stators 130 may be included, e.g., seven stators. Additionally or alternatively, at least one of each of electrical components 156-159 and 162-164 may be included and/or associated with each of the plurality of stators 130.

Figure 2D:
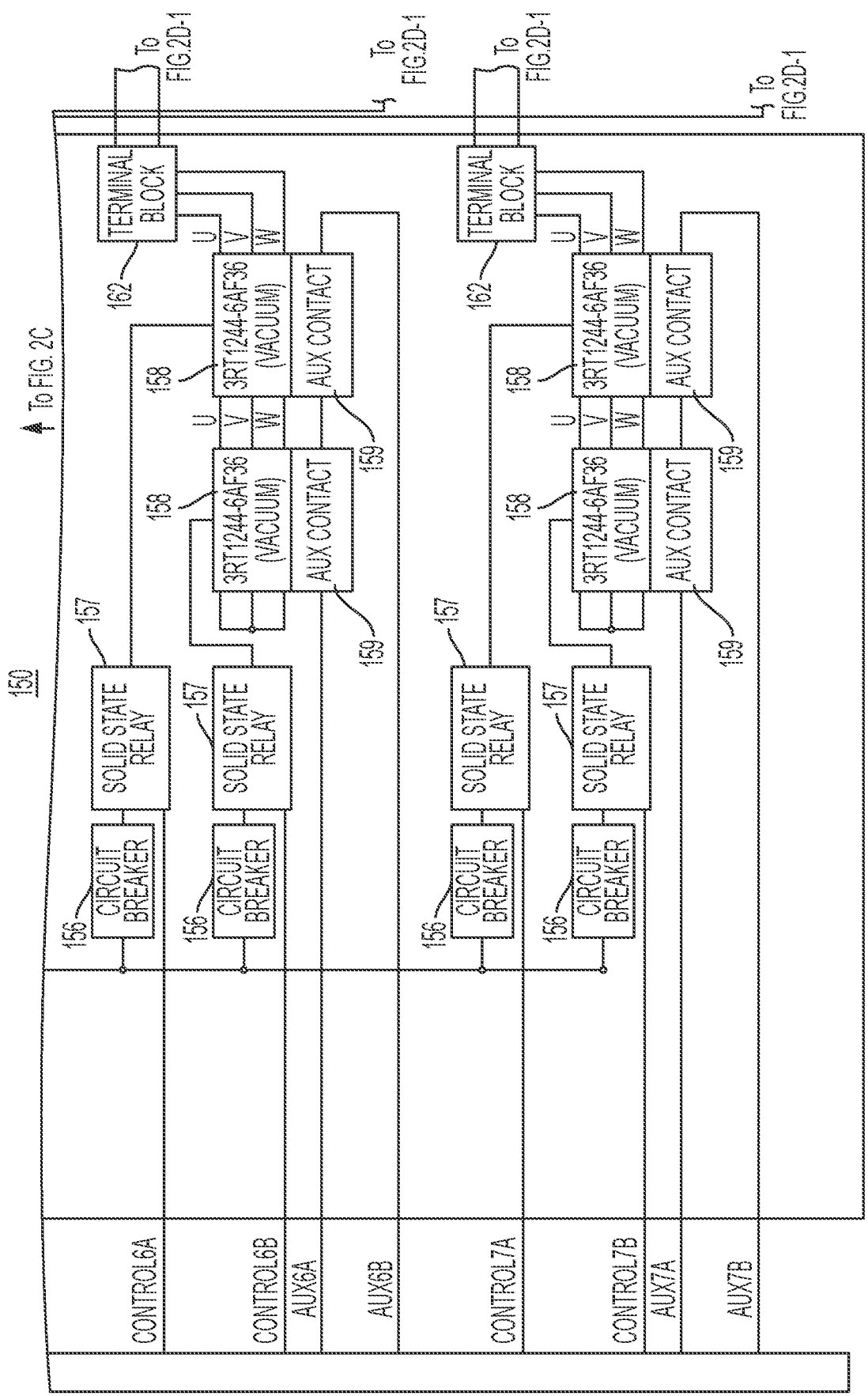
Figures 1, 2D:
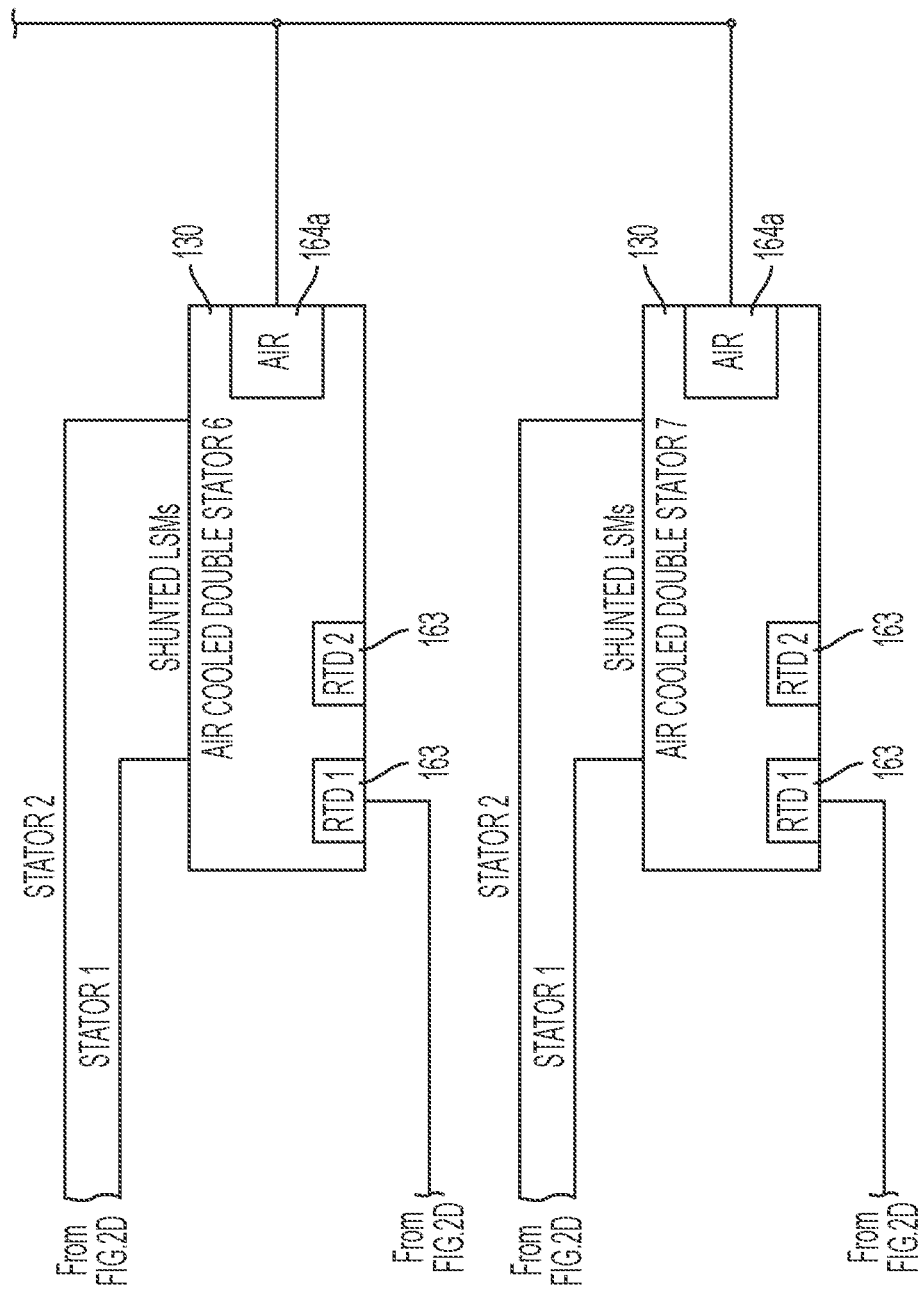

Referring now to FIGS. 1-2D-1, in some non-limiting embodiments, stator(s) 130 may work in conjunction with linear permanent magnet carrier(s) 120. Additionally or alternatively, shunted stator(s) 130 may be mounted in linear series along a track for conveyance(s) 110 and/or linear permanent magnet carrier(s) 120. In some non-limiting embodiments, shunted stator(s) 130 may act similarly to a brake and/or provide speed reduction/retarding of conveyance 110. In some non-limiting embodiments, shunted stator(s) 130 may reduce velocity/speed of conveyance 110. Additionally or alternatively, magnetic brakes and/or mechanical brakes (e.g., pinch brakes and/or the like) may be used in conjunction with shunted stator(s) 130 to reduce velocity/speed, stop, and/or hold conveyance 110. In some non-limiting embodiments, shunted stator(s) may be placed at a block point (e.g., a location to stop and/or hold conveyance 110) and/or a trim point (e.g., a location to reduce a speed of conveyance 110). Additionally or alternatively, shunted stator(s) 130 at a block point or trim point may be controlled using an associated shunting contactor enclosure, as described with regard to FIGS. 2A-2D-1.

In some non-limiting embodiments, the devices, components, and/or the like of system 100 may be controlled by a controller, e.g., controller 140, controller 500, a ride control system (RCS), an SSC, and/or the like. Additionally or alternatively, each SSC may have a remote input/output interface (I/O) to connect with a system controller (e.g., RSC, controller 140, controller 500, and/or the like), monitoring devices, and/or the like. In some non-limiting embodiments, each block point location may have a local operator control console (OCC), e.g., for local actuation and monitoring of equipment. Additionally or alternatively, each local OCC may be within visual sight of the equipment being operated and/or may be environmentally protected.

In some non-limiting embodiments, each stator 130 and/or some of stator(s) 130 may include a double stator (e.g., two electrical stators). Additionally or alternatively, each electrical stator of stator(s) 130 may be independently controlled and monitored. For example, each electrical stator may include a respective current-interrupting device, and each current-interrupting device may be housed in its own enclosure, as described herein.

In some non-limiting embodiments, when stator(s) 130 is not shunted, there may be no braking/retarding forces applied to conveyance 110. Additionally or alternatively, conveyance 110 may pass through a region of stator(s) 130 without any velocity/speed reduction if such stator(s) 130 are not shunted.

In some non-limiting embodiments, a fail-safe condition of stator 130 may be non-actuated (e.g., de-energized for no shunting). Additionally or alternatively, deceleration limits may not be exceeded if any emergency brake (e.g., magnetic brake and/or the like) is actuated.

In some non-limiting embodiments, shunting contactor electrical circuits (e.g., of electrical components 150) and/or contactor control coils may be configured so that loss of a control signal may cause stator(s) 130 to fail to de-energize (e.g., no velocity/speed reduction). For example, a loss of a control signal may be associated with a loss of facility control power, a fault or failure of a block point SSC, disconnection of a connector or wire, a loss of wiring or cut wire, a burnt-out contactor control coil, and/or the like.

In some non-limiting embodiments, a default entry condition for a block point or trim point may be with stator(s) 130 (e.g., all stator(s) at such block or trim point) actuated (energized). Additionally or alternatively, an amount of velocity/speed reduction by shunting may be removed (de-energized) based on an actual conveyance 110 velocity/speed and/or a desired exit velocity/speed (e.g., as sensed by the block point SSC).

In some non-limiting embodiments, for an exemplary block point, during the majority of proper operation, some stators 130 (e.g., the first four stators 130 of six or seven stators 130) may not normally be de-energized. Additionally or alternatively, some stators 130 (e.g., a last two or three stators of six or seven stators 130) may be de-energized while shunting.

In some non-limiting embodiments, a failure of a shunted stator 130 may cause a stop of the conveyance (e.g., an emergency stop with emergency brakes).

In some non-limiting embodiments, a controller (e.g., controller 140, controller 500, SSC, and/or the like) may use exclusively digital controls. Additionally or alternatively, some analog signals (e.g., from temperature sensors 163, such as RTDs) may be used for monitoring temperature/over-heating of stator(s) 130. Additionally or alternatively, a controller (e.g., controller 140, controller 500, SSC, and/or the like) may use at least some analog controls.

In some non-limiting embodiments, control signals of a selected/predetermined voltage (e.g., +24 VDC) may be used for at least some components of system 100 e.g., for integral, interposing control devices in the form of SSRs.

In some non-limiting embodiments, signal cabling and/or wiring, for both control and monitoring devices, may be sufficiently shielded and/or properly grounded to prevent spurious operation and/or associated faults due to interference (e.g., electromagnetic interference (EMI), radiofrequency interference (RFI), and/or the like). Additionally or alternatively, to prevent failures of wiring (e.g., a single point failures (SPF)), control devices (e.g., controller 140, controller 500, SSC, and/or the like) may utilize separate and discrete two-wire twisted pair (e.g., not a single common wire).

In some non-limiting embodiments, components and/or equipment of system 100 (or portions thereof) with digital (e.g., on/off state) control devices (e.g., SSRs) may draw less than 1.0 amp of current, so that devices can be directly controlled by a safety programmable logic controller (PLC) output module.

In some non-limiting embodiments, cooling medium 164a (e.g., air supply) may be clean and dry (e.g., with air in accordance with ISO 8573.1, Class 2). Additionally or alternatively, "last-chance" air filters may be provided at the coolant control device 164 (e.g., cooling pneumatic panel) and/or enclosure 151 (e.g., shunted contactor enclosure and/or the like) of electrical components 150 (or a portion thereof). In some non-limiting embodiments, dry air (e.g., without moisture) may be useful to prevent potential icing and/or plugging of air cooling ports of stator(s) 130 and/or causing issues with the moisture inside of enclosure 151 (e.g., shunting contactor enclosure and/or the like).

In some non-limiting embodiments, multiple block points and/or trim points may be established along a path of motion of conveyance 110 (e.g., a track, and/or the like). For example, block points and/or trim points may each include at least one stator 130, which may be shunted, as described herein. Additionally or alternatively, at least some of the block points may be able to stop and/or hold conveyance 110, e.g., using shunted stator(s) 130, which may be used in combination with magnetic brakes and/or friction-type pinch brakes. Additionally or alternatively, if stator(s) 130 fail, emergency brakes (e.g., magnetic brakes and/or friction-type pinch brakes) may stop and/or hold conveyance 110. In some non-limiting embodiments, shunted stator(s) 130 (and/or a controller thereof) may be capable of adjusting an exit speed of conveyance 110 passing thereby.

In some non-limiting embodiments, stator(s) 130 may be energized (e.g., stator coils in an open-circuit state) to allow conveyance 110 to pass thereby without reducing velocity (e.g., braking). Additionally or alternatively, stator(s) 130 may reduce velocity (e.g., brake) conveyance 110 when in an un-energized (e.g., shunted and/or short-circuit state). Additionally or alternatively, un-energized (e.g., shunted and/or short-circuit state) may be a default state of stator(s) 130.

In some non-limiting embodiments, reducing velocity/speed of conveyance 110 may be enhanced by conveyance 110 having sufficient velocity/speed to induce sufficient current in stator coils of stator(s) 130. Additionally or alternatively, a controller (e.g., controller 140, controller 500, SSC, and/or the like) may detect whether conveyance 110 has sufficient velocity/speed to induce sufficient current in stator coils of stator(s) 130 for reduction of velocity/speed (e.g., braking). In some non-limiting embodiments, the controller (e.g., controller 140, controller 500, SSC, and/or the like) may determine to use emergency brakes (e.g., magnetic and/or mechanical brakes) if the velocity of conveyance 110 is too slow (e.g., too low to induce sufficient current in stator coils of stator(s) 130) and/or if the velocity of conveyance 110 is too high (e.g., too large to sufficiently reduce the velocity/speed over the length/region proximate stator(s) 130).

In some non-limiting embodiments, a controller (e.g., controller 140, controller 500, SSC, and/or the like) may detect whether velocity/speed of conveyance 110 has been sufficiently reduced to a desired exit velocity/speed in the region of stator(s) 130 while shunted. If so, the controller may determine to open the circuit of the coil wires of the stator coils of stator(s) 130 to end reduction in velocity/speed (e.g., discontinue braking). Additionally or alternatively, if the controller detects velocity/speed of conveyance 110 has not been reduced to the desired exit velocity/speed, the controller may engage emergency brakes (e.g., magnetic and/or mechanical brakes).

In some non-limiting embodiments, shunted stator(s) may drastically reduce the variation in exit velocity/speed (e.g., compared with using magnetic brakes), which may occur (or otherwise occur) from the differences in environmental conditions (e.g., wind, conveyance weight (e.g., empty or full conveyance), and/or the like).

In some non-limiting embodiments, an amount of velocity/speed reduction (e.g., braking force by one or more shunted stator(s) 130) may be determined (e.g., by a controller such as controller 140, controller 500, SSC, and/or the like) to reduce the velocity/speed of conveyance 110 to a desired exit velocity/speed within the range of stator(s) 130 (e.g., a distance available at a block point, a trim point, and/or the like). Additionally or alternatively, a duration of velocity/speed reduction (e.g., braking force by one or more shunted stator(s) 130) may be controlled (e.g., by a controller such as controller 140, controller 500, SSC, and/or the like) to achieve the desired exit velocity/speed. For example, the duration may be based on the entry velocity/speed, the weight, and/or the like of conveyance 110. In some non-limiting embodiments, a maximum safe entry speed may be based on an available range of stator(s) 130 (e.g., distance of a block point, a trim point, and/or the like) and/or an operational deceleration limit (e.g., which may be predetermined, selected, and/or the like).

Figure 3:
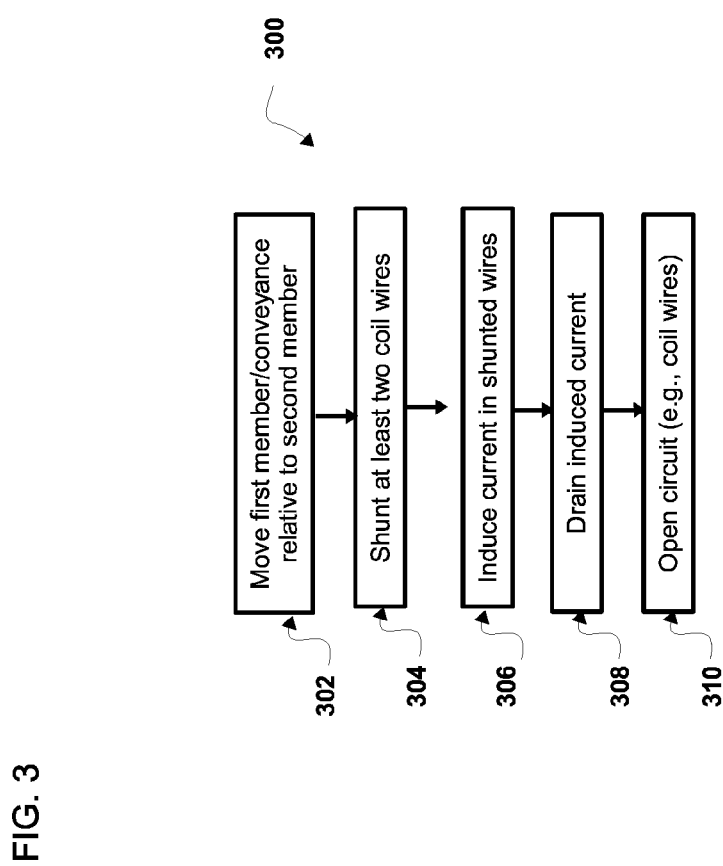
FIG. 3 is a flowchart of a non-limiting embodiment of a process for optical sensing according to the principles of the presently disclosed subject matter.

Referring now to FIG. 3, FIG. 3 is a flowchart of a non-limiting embodiment of a process 300 for reducing a velocity of a conveyance. In some non-limiting embodiments, one or more of the steps of process 300 may be performed (e.g., completely, partially, and/or the like) by system 100 (e.g., one or more devices or components of system 100). In some non-limiting embodiments, one or more of the steps of process 300 may be performed (e.g., completely, partially, and/or the like) by controller 500 (e.g., one or more devices or components of controller 500). In some non-limiting embodiments, one or more of the steps of process 300 may be performed (e.g., completely, partially, and/or the like) by another system, another device, another component, another group of systems, another group of devices, or another group of components separate from or including system 100 and/or controller 500.

As shown in FIG. 3, at step 302, process 300 may include moving a first member of a linear motor and/or a conveyance relative to a second member of the linear motor. For example, linear permanent magnet carrier 120 (and/or conveyance 110, which may be attached thereto) may move and/or be moving relative to stator 130, as described herein. Additionally or alternatively, stator 130 may be separate from linear permanent magnet carrier 120, as described herein. In some non-limiting embodiments, stator 130 may include stator coils, as described herein.

As shown in FIG. 3, at step 304, process 300 may include shunting at least two coil wires. For example, at least two coil wires of the stator coils of stator 130 may be shunted (e.g., by controller 140, electrical components 150, and/or the like), as described herein. For example, at least two coil wires may be shunted by shorting (e.g., closing an electrical connection between) such coil wires together, as described herein.

In some non-limiting embodiments, shunting at least two coil wires may include shunting such coil wires using a current-interrupting device, as described herein.

As shown in FIG. 3, at step 306, process 300 may include inducing a current in the shunted wires. For example, the shunted coil wires of the stator coils of stator 130 may have a current induced therein by moving linear permanent magnet carrier 120 (and/or conveyance 110, which may be attached thereto) relative to stator 130 while the coil wires are shunted, as described herein.

In some non-limiting embodiments, a velocity of linear permanent magnet carrier 120 (and/or conveyance 110, which may be attached thereto) may be reduced by inducing the current in the stator coils, as described herein.

As shown in FIG. 3, at step 308, process 300 may include draining the induced current. For example, the induced current may be drained through a short circuit loop that may include the at least two coil wires of the stator coils of stator 130 (and/or electrical components 150, such as power connections and/or the like) when such coil wires are shunted, as described herein.

As shown in FIG. 3, at step 310, process 300 may include opening the circuit. For example, an electrical connection (e.g., short circuit connection and/or the like) between the at least two coils of the stator coils of stator 130 may be opened (e.g., by controller 140 and/or electrical components 150), as described herein. For example, such electrical connection/circuit may be opened when not shunting the coil wires and/or when reducing the velocity/speed of conveyance 110 is not desired, as described herein.

Figure 4:
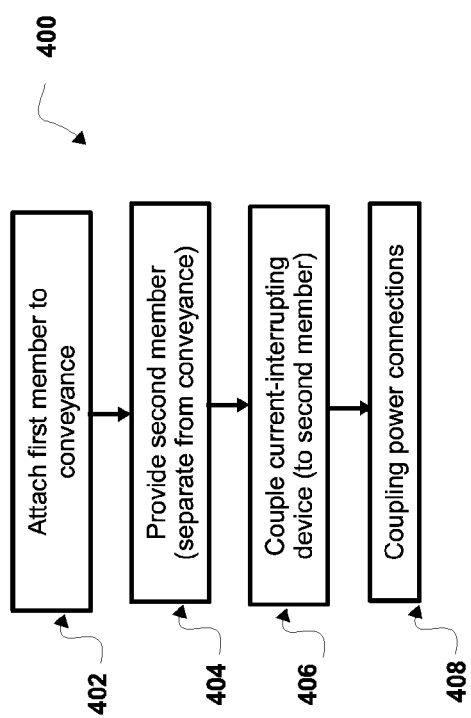
FIG. 4 is a flowchart of a non-limiting embodiment of a process for making a system for optical sensing according to the principles of the presently disclosed subject matter.

Referring now to FIG. 4, FIG. 4 is a flowchart of a non-limiting embodiment of a process 400 for making a system for reducing a velocity of a conveyance. As shown in FIG. 4, at step 402, process 400 may include attaching a first member of a linear motor to a conveyance. For example, linear permanent magnet carrier 120 may be attached to conveyance 110, as described herein.

As shown in FIG. 4, at step 404, process 400 may include providing a second member of the linear motor. For example, at least one stator 130 may be provided. In some non-limiting embodiments, stator(s) 130 may be separate from linear permanent magnet carrier 120 (and/or conveyance 110, which may be attached thereto), as described herein. In some non-limiting embodiments, stator(s) 130 may be positioned along and/or parallel with a path of motion of linear permanent magnet carrier 120 and/or conveyance 110, as described herein. For example, linear permanent magnet carrier 120 and/or conveyance 110 may move along a track, and stator(s) 130 may be integrated with, positioned proximate to, aligned along, and/or the like with such a track, as described herein.

As shown in FIG. 4, at step 406, process 400 may include coupling a current-interrupting device, e.g., to the second member of the linear motor. For example, a current-interrupting device (e.g., electrical components 150 or a portion thereof, controller 140, and/or the like) may be coupled to stator(s) 130, as described herein. In some non-limiting embodiments, the current-interrupting device (e.g., electrical components 150 or a portion thereof, controller 140, and/or the like) may be configured to selectively shunt at least two coil wires of the stator coils of stator(s) 130 by shorting (e.g., closing an electrical connection between) such coil wires, as described herein.

In some non-limiting embodiments, the current-interrupting device (e.g., electrical components 150 or a portion thereof, controller 140, and/or the like) may include a contactor, a thyristor, a combination thereof, and/or the like, as described herein. Additionally or alternatively, the current-interrupting device (e.g., electrical components 150 or a portion thereof, controller 140, and/or the like) may be configured to correspond to a maximum desired current of an induced current caused by linear permanent magnet carrier 120 moving relative to stator(s) 130, as described herein. In some non-limiting embodiments, the current-interrupting device (e.g., electrical components 150 or a portion thereof, controller 140, and/or the like) may be configured to selectively open an electrical connection between the at least two coil wires when not selectively shunting the at least two coil wires of the stator coils of stator(s) 130, as described herein.

As shown in FIG. 4, at step 408, process 400 may include coupling power connections. For example, power connections (e.g., electrical components 150, a portion thereof, and/or the like) may be coupled to stator(s) 130, as described herein.

Referring now to FIG. 5, FIG. 5 is a diagram of example components of a controller 500. Controller 500 may correspond to one or more controllers of system 100. In some non-limiting embodiments, system 100 may include at least one controller 500 and/or at least one component of controller 500. As shown in FIG. 5, controller 500 may include bus 502, processor 504, memory 506, storage component 508, input component 510, output component 512, and communication interface 514.

Bus 502 may include a component that permits communication among the components of device 500. In some non-limiting embodiments, processor 504 may be implemented in hardware, software, firmware, or any combination thereof. For example, processor 504 may include a processor (e.g., a central processing unit (CPU), a graphics processing unit (GPU), an accelerated processing unit (APU), and/or the like), a microprocessor, a digital signal processor (DSP), a programmable logic controller (PLC), and/or any processing component (e.g., a field-programmable gate array (FPGA), an application-specific integrated circuit (ASIC), and/or the like), and/or the like, which can be programmed to perform a function. Memory 506 may include random access memory (RAM), read only memory (ROM), and/or another type of dynamic or static storage device (e.g., flash memory, magnetic memory, optical memory, and/or the like) that stores information and/or instructions for use by processor 504.

Storage component 508 may store information and/or software related to the operation and use of controller 500. For example, storage component 508 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 510 may include a component that permits controller 500 to receive information, such as via user input (e.g., a touch screen display, a keyboard, a keypad, a mouse, a button, a switch, a microphone, a camera, and/or the like). Additionally or alternatively, input component 510 may include a sensor for sensing information (e.g., a global positioning system (GPS) component, an accelerometer, a gyroscope, an actuator, a temperature sensor, a thermometer, a velocity/speed sensor, and/or the like) an electrical connection/coupling to a sensor, and/or the like. Output component 512 may include a component that provides output information from controller 500 (e.g., a display, a speaker, one or more light-emitting diodes (LEDs), and/or the like).

Communication interface 514 may include a transceiver-like component (e.g., a transceiver, a receiver and transmitter that are separate, and/or the like) that enables device 500 to communicate with other devices, such as via a wired connection, a wireless connection, or a combination of wired and wireless connections. Communication interface 514 may permit controller 500 to receive information from another device and/or provide information to another device. For example, communication interface 514 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Controller 500 may perform one or more processes described herein. Controller 500 may perform these processes based on processor 504 executing software instructions stored by a computer-readable medium, such as memory 506 and/or storage component 508. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 506 and/or storage component 508 from another computer-readable medium or from another device via communication interface 514. When executed, software instructions stored in memory 506 and/or storage component 508 may cause processor 504 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 5 are provided as an example. In some non-limiting embodiments, controller 500 may include additional components, fewer components, different components, or differently arranged components than those shown in FIG. 5. Additionally or alternatively, a set of components (e.g., one or more components) of controller 500 may perform one or more functions described as being performed by another set of components of controller 500.

Non-limiting embodiments of the disclosed subject matter may be used for many different industries and purposes, including linear motors (e.g., LSMs and/or the like) utilized in linear motion for, e.g., trains, people movers, amusement rides, conveyor systems, industrial/manufacturing systems, automation systems, and/or the like. Additionally or alternatively, the disclosed subject matter may be used for any industry or purpose where fine-tuned, repeatable, and reliable reduction of velocity (e.g., braking and/or the like) is useful.

In some non-limiting embodiments, the disclosed subject matter may be used to reduce velocity of a conveyance similar to a mechanical brake, but, unlike mechanical brakes, the disclosed subject matter may achieve a reduction in conveyance speed/velocity without using any contacting parts, moving parts, mechanical wear elements, and/or the like. Additionally or alternatively, the disclosed subject matter may provide unexpected and superior results over a mechanical brake in that the disclosed subject matter may provide for nearly perfectly repeatable control, unlike a mechanical brake that may have degrading performance over time as the mechanical elements wear.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A system for reducing velocity of a conveyance, comprising:
   a conveyance;
   a first member of a linear motor attached to the conveyance;
   a second member of the linear motor, the second member comprising stator coils, the second member separate from the first member and separate from the conveyance, the first member moveable relative to the second member; and
   a current-interrupting device configured to selectively shunt at least two coil wires of the stator coils by shorting the at least two coil wires.

2. The system of claim 1, wherein the current interrupting device comprises at least one of a contactor, a thyristor, or a combination thereof.

3. The system of claim 1, wherein a velocity of the conveyance is reduced upon the first member moving relative to the second member while the current-interrupting device shunts the at least two coil wires of the stator coils.

4. The system of claim 3, wherein an induced current in the stator coils caused by the first member moving relative to the second member is drained through a short circuit loop comprising the at least two coil wires when shunted.

5. The system of claim 4, wherein the current-interrupting device is configured to correspond to a maximum desired current of the induced current.

6. The system of claim 1, wherein the first member comprises a linear permanent magnet carrier, wherein the second member comprises a stator.

7. The system of claim 6, wherein motion of the linear permanent magnet carrier relative to the stator induces an induced current in the stator coils of the stator.

8. The system of claim 7, further comprising power connections coupled to the stator coils, wherein the stator coils have a first resistance and the power connections have a second resistance, wherein the stator coils and the power connections combine to have a combined resistance.

9. The system of claim 8, wherein the combined resistance of the stator coils and the power connections results in reducing the velocity of the first member and the conveyance upon the first member moving relative to the second member while the current-interrupting device shunts the at least two coil wires of the stator coils.

10. The system of claim 1, wherein the current-interrupting device is further configured to selectively open an electrical connection between the at least two coil wires when not selectively shunting the at least two coil wires.

11. A method for reducing a velocity of a conveyance, comprising:
    moving a first member of a linear motor relative to a second member of the linear motor, the first member attached to a conveyance, the second member comprising stator coils, the second member separate from the first member and separate from the conveyance;
    shunting at least two coil wires of the stator coils by shorting the at least two coil wires; and
    inducing an induced current in the stator coils by moving the first member relative to the second member while the at least two coil wires are shunted.

12. The method of claim 11, wherein shunting the at least two coil wires comprises shunting the at least two coil wires using a current-interrupting device.

13. The method of claim 11, wherein a velocity of the conveyance is reduced by inducing the current in the stator coils by moving the first member relative to the second member while the at least two coil wires are shunted.

14. The method of claim 11, further comprising draining the induced current through a short circuit loop comprising the at least two coil wires when shunted.

15. The method of claim 11, wherein the first member comprises a linear permanent magnet carrier, and wherein the second member comprises a stator.

16. The method of claim 11, further comprising opening an electrical connection between the at least two coil wires when not shunting the at least two coil wires.

17. A method of making a system for reducing a velocity of a conveyance, comprising:
attaching a first member of a linear motor to a conveyance;
providing a second member of the linear motor comprising stator coils, the second member separate from the first member and separate from the conveyance, the first member moveable relative to the second member; and
coupling a current-interrupting device to the second member, the current-interrupting device configured to selectively shunt at least two coil wires of the stator coils by shorting the at least two coil wires.

18. The method of claim 17, wherein the current-interrupting device comprises at least one of a contactor, a thyristor, or a combination thereof.

19. The method of claim 17, wherein the current-interrupting device is configured to correspond to a maximum desired current of an induced current caused by the first member moving relative to the second member.

20. The method of claim 17, wherein the first member comprises a linear permanent magnet carrier, and wherein the second member comprises a stator.

21. The method of claim 17, further comprising coupling power connections to the stator coils.

22. The method of claim 17, wherein the current-interrupting device is further configured to selectively open an electrical connection between the at least two coil wires when not selectively shunting the at least two coil wires.

* * * * *